United States Patent [19]

Wardzala

[11] Patent Number: 5,010,403
[45] Date of Patent: Apr. 23, 1991

[54] MEASUREMENT OF TIMEBASE JITTER FOR COMPONENT VIDEO

[75] Inventor: Edward D. Wardzala, Portland, Oreg.

[73] Assignee: Tektronix, Inc., Beaverton, Oreg.

[21] Appl. No.: 507,817

[22] Filed: Apr. 12, 1990

[51] Int. Cl.$^5$ .......................................... H04N 17/00
[52] U.S. Cl. .................................... 358/139; 358/166; 358/167; 358/10
[58] Field of Search ................. 358/10, 139, 166, 167, 358/36, 37; 324/121 R

[56] References Cited

U.S. PATENT DOCUMENTS

| | | | |
|---|---|---|---|
| 4,488,168 | 12/1984 | Mino | 358/10 |
| 4,729,025 | 3/1988 | Yanase | 358/166 |
| 4,829,366 | 5/1989 | Penney | 358/10 |
| 4,875,089 | 10/1989 | Judge | 358/10 |

Primary Examiner—James J. Groody
Assistant Examiner—Sherrie Hsia
Attorney, Agent, or Firm—Francis I. Gray

[57] ABSTRACT

A method of measuring timebase jitter for component video compares a test signal from a reference signal generator, such as a bowtie signal or a fixed carrier frequency signal, with the same test signal from a local phase locked signal generator for which timing jitter is to be determined. The test signals are timed to be coincident by adjusting appropriate delay lines and timing controls. For a bowtie signal the width of an indeterminate region for the intersection of the bowtie signal is a measure of the timebase jitter, the value of which is determined using the cursors provided by the bowtie signal. For a fixed carrier frequency signal the respective test signals are equalized in amplitude and timed for coincidence, and then modulated together. The modulated signal is lowpass filtered and processed by a fast Fourier transform to provide a display of the timebase jitter.

12 Claims, 3 Drawing Sheets

MEASUREMENT OF TIMEBASE JITTER FOR COMPONENT VIDEO

BACKGROUND OF THE INVENTION

The present invention relates to timing measurements, and more particularly to the measurement of timebase jitter for component video.

In a gen-locked television system it is desirable to eliminate any phase jitter from the system. A phase jitter of as little as three nanoseconds can produce a noticeable chrominance aberration on edges when observed on a picture monitor. For composite video signals vectorscopes have been traditionally used to observe timing of the television system. However when only component video signals are available, vectorscopes cannot be used to measure timing errors including jitter. With the advent of component television studios and with the introduction of high definition television (HDTV) systems that use only component video signals, there is no measurement instrument comparable to the vectorscope for measuring timing jitter.

Therefore what is desired is a method of measurement of timebase jitter for component video that provides accurate jitter determinations of one nanosecond or less.

SUMMARY OF THE INVENTION

Accordingly the present invention provides a method of measurement of timebase jitter for component video by comparing the component output of a reference signal generator with the component output of a local phase locked signal generator. A sync signal from the reference signal generator is input via a first delay line to the local phase locked signal generator. The component video signals from the reference signal generator are input to a second delay line. The delay lines may be lengths of coaxial cable. A reference component video from one of the signal generators is compared with another component of the other signal generator visually on an oscilloscope or other type of waveform monitor. The timing between the two channels is adjusted to be equal, and the resulting jitter is then displayed or automatically processed to determine the timebase jitter of the television system.

The objects, advantages and other novel features of the present invention are apparent from the following detailed description when read in conjunction with the attached claims and appended drawing.

DESCRIPTION OF THE PREFERRED EMBODIMENT

Figure 1:
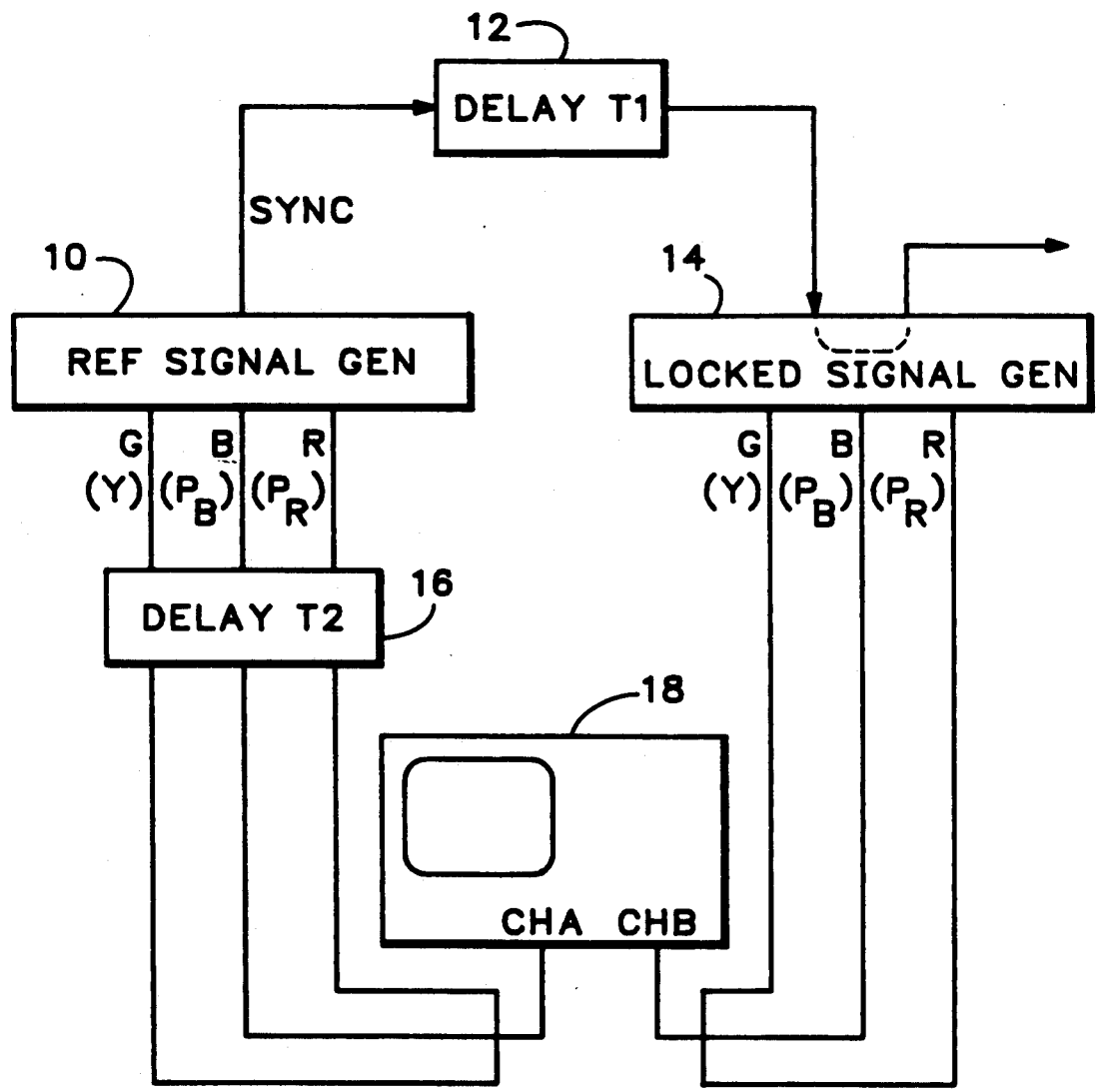
FIG. 1 is a block diagram of a system for measuring timebase jitter for component video according to the present invention.

Referring now to FIG. 1 a reference signal generator 10 provides component video signals (GBR or Y,Pb,Pr) and a sync signal. The sync signal is input via a first delay line 12 to a local phase locked signal generator 14 that outputs component video signals. The component video signals from the reference signal generator 10 are input to a second delay line 16. Normally the G or Y video component is considered to be a reference component, and the other two video components are compared against this reference component to provide time coincidence of the outputs of the component video components. The reference video component from one of the signal generators 10, 14 is input to one channel of a dual channel waveform display device 18, such as an oscilloscope or television waveform monitor, and one of the other components from the other signal generator is input to the second channel of the waveform display device. The display device 18 is capable of inverting and varying the gain of channel B and summing the inverted, gain equalized signal with the signal on channel A.

Figure 2:
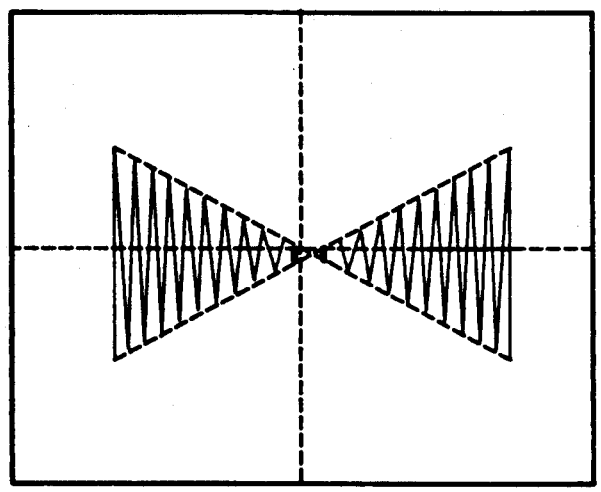
FIG. 2 is a graphic display of a signal used to measure timebase jitter according to the present invention.
Figure 3:
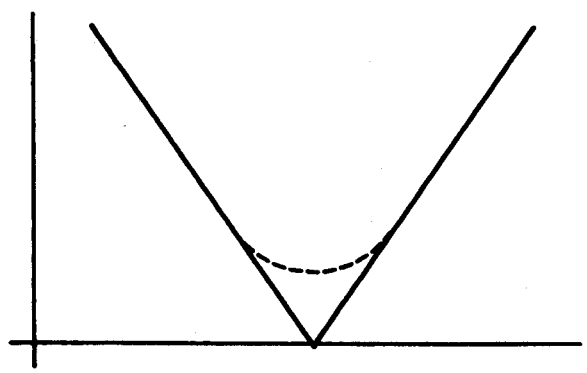
FIG. 3 is a graphic representation of timing convergence ideally and in the presence of timing jitter.

A test signal that may be used for timebase jitter measurement is disclosed in U.S. Pat. No. 4,829,366 issued on May 9, 1989 to Bruce J. Penney entitled "Method and Apparatus for Measuring Delay and/or Gain Difference Using Two Different Frequency Sources." This test signal outputs two burst signals at slightly different frequencies, such as 5.00 MHz and 5.002 MHz, one for the reference component and the other for the other components, that are timed to be in phase in the middle of a video horizontal line. The resulting display, as shown in FIG. 2, is in the form of a "bowtie" with the "null" point determining the relative timing between the two component video signals input to the display device. The "bowtie" test signal also includes timing markers on the reference component channel. The timing between the reference component of one signal generator 10, 14 and one of the other components of the other signal generator is adjusted by the respective delay lines 12, 16 as well as by a reference timing adjustment control in the local phase locked signal generator 14 so that the null occurs at the middle of the horizontal line. Ideally as shown in FIG. 3 the intersection of the "bowtie" display should converge to a unique point. However due to timing jitter there is a region about the center point of the horizontal line within which the intersection is indeterminate. The width of this indeterminate region is the measure of the timing jitter for the local phase locked signal generator. The timing markers of the "bowtie" test signal are used to measure this indeterminate region. Since the component video signals are derived from a single master clock within the signal generator, once timing is established between the reference component of one generator and one of the other components of the other signal generator system timing is complete. Otherwise characterization of the other component channels is necessary in the same manner.

Figure 5:
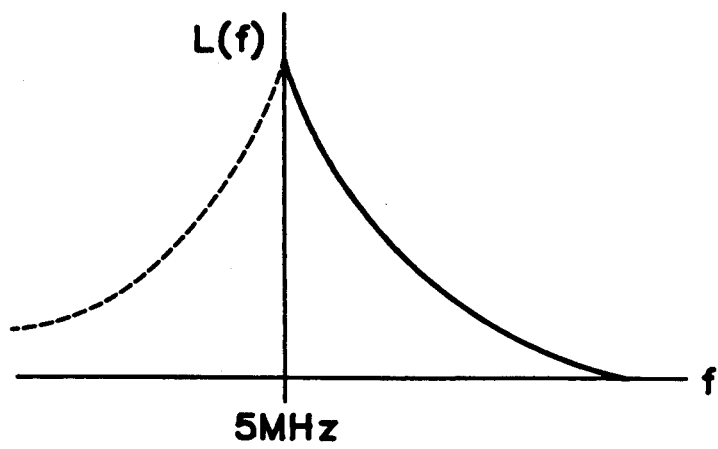
FIG. 5 is a graphic representation of timing jitter as determined by the system of FIG. 4.
Figure 4:
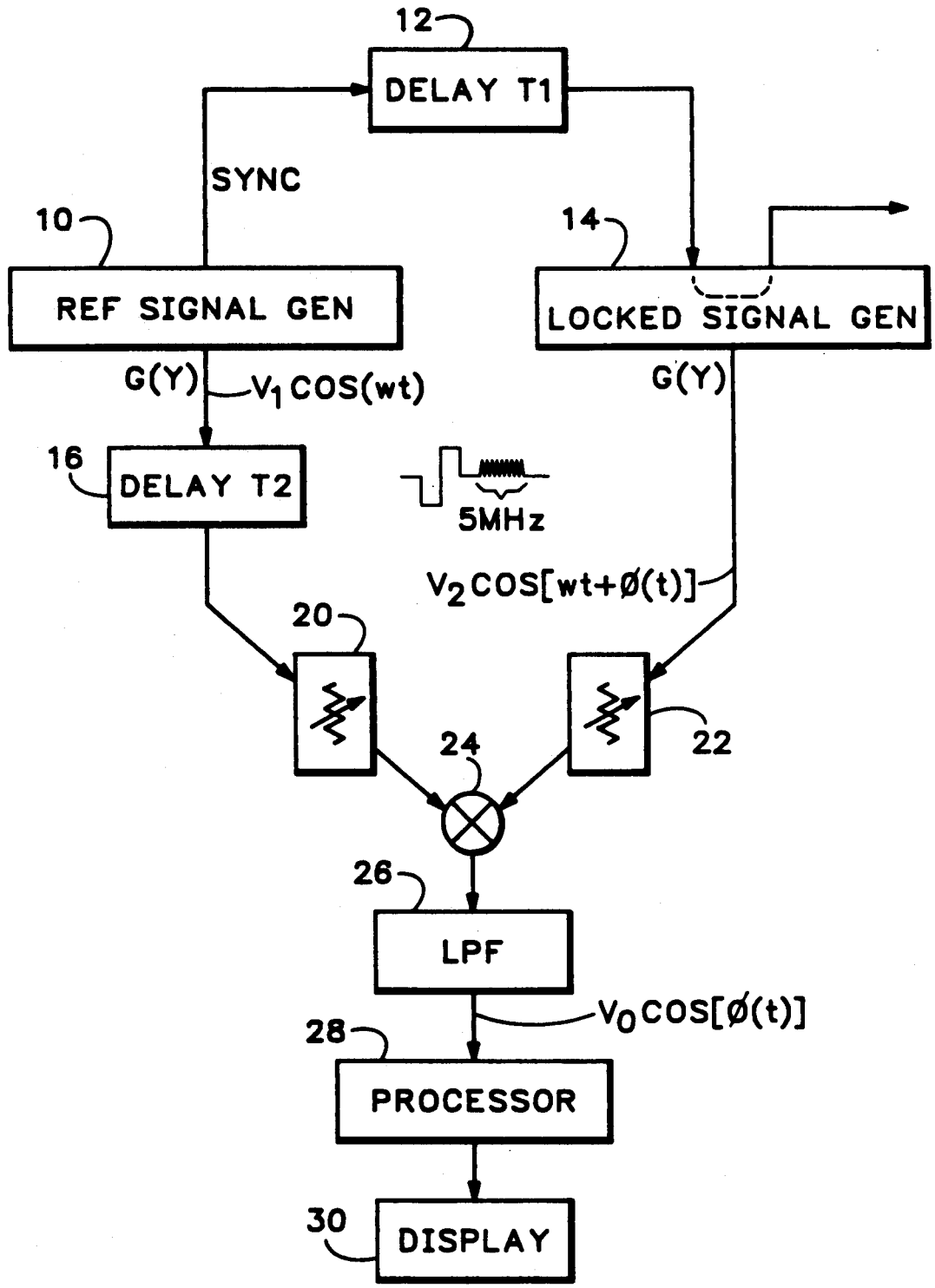
FIG. 4 is a block diagram of an alternate embodiment of a system for measuring timebase jitter according to the present invention.

An alternative signal for automatic timebase jitter measurement is to use a test signal that provides a fixed frequency sinusoidal signal for both signal generators 10, 14, such as a five megahertz sinusoidal signal as shown in FIG. 4. Only the reference component from each signal generator 10, 14 is used. The reference signal generator 10 is coupled to the local phase locked signal generator 14 using the first and second delay lines 12, 16 as described previously. The reference components are input to respective attenuators 20, 22 to equalize the amplitudes between the two channels, and the reference timing adjustment in the local signal generator 14 together with the delay lines 12, 16 are used to adjust the timing between the two channels. The outputs of the two attenuators 20, 22 are input to a modulator 24, and the output of the modulator is input to a lowpass filter 26. If the reference component is V1*cos(wt), then the resulting genlocked component is V2*cos(wt+$\phi$(t)) where V1 and V2 are the respective amplitudes, w is the carrier frequency and $\phi$(t) is the phase jitter over time. The output of the lowpass filter 26 is V*cos($\phi$(t)) which is the timing jitter component. The timing jitter component is input to a processor 28, such as a fast Fourier transform (FFT) processor, and the results are displayed on an appropriate display device 30. As shown in FIG. 5 the result is a frequency spectrum about the carrier frequency shifted to d.c. from which the timing jitter is measured.

When viewed on an oscilloscope the jitter component $\phi$(t) appears as a time instantaneous jitter, cos$\phi$. Starting with V*cos($\phi$(t)), the signal is normalized to obtain cos($\phi$(t)). Taking the arccosine of the normalized signal produces $\phi$(t). A phase-locked, or gen-locked, loop is defined to be in lock if $-90° \leq \phi \leq +90°$ at the lock frequency. For the system to remain genlocked, the value of cos($\phi$(t)) has a magnitude less than one. The phase jitter is input to the FFT processor 28 to produce a spectrum about d.c. and each harmonic of the horizontal line rate, i.e., the spectral density of the jitter component. The time instantaneous jitter, before FFT processing, also is useful to observe the span of peak-to-peak jitter that may be expected in the system 14 under test. The spectral density after FFT processing may identify causes of the jitter, such as hum, interference and the like.

Thus the present invention provides a measurement of timebase jitter for component video by using an appropriate test signal and a reference signal generator, adjusting the timing between the reference signal generator and a local phase locked signal generator, and displaying the result in the form of an indeterminate region, the width of which is a measure of the jitter, or in the form of a spectrum about a d.c. transformed carrier signal.

What is claimed is:

1. A method of measuring timebase jitter comprising the steps of:
   generating a test signal from a reference signal generator and from a local signal generator the two test signals being identical;
   adjusting the timing between the two test signals; and
   processing the test signals together to provide a display of the timebase jitter 2. A method as recited in claim 1 wherein each test signal comprises a bowtie test signal.

3. A method as recited in claim 2 wherein the adjusting step comprises the step of adjusting the delay between the reference signal generator and the local signal generator until the intersection of the combination of a reference component, from one of the signal generators and another component from the other signal generator occurs approximately at the middle of the display.

4. A method as recited in claim 3 wherein the processing step comprises the step of determining from markers provided by the bowtie test signal the width of an indeterminate region about the middle of the display within which the intersection moves, the width determining the timebase jitter.

5. A method as recited in claim 1 wherein each test signal comprises a fixed carrier frequency test signal.

6. A method as recited in claim 5 wherein the processing step comprises the steps of:
   modulating the two test signals together to produce a modulated signal;
   lowpass filtering the modulated signal; and
   fast Fourier transforming the filtered modulated signal to produce the display of timebase jitter in the form of a frequency spectrum about d.c.

7. An apparatus for measuring timebase jitter in a component video system having a local phase-locked component signal generator comprising:
   a reference component signal generator having a sync output coupled to the local phase-locked component signal generator for synchronizing the local phase-locked component signal generator to the reference component signal generator, and having a component test signal output;
   means for displaying one of the components of the component test signal output together with another one of the components of an identical component test signal output from the local phase-locked component signal generator; and
   means for adjusting the timing between the two component test signal outputs to provide a meaningful display of timebase jitter on the displaying means.

8. An apparatus as recited in claim 7 wherein the adjusting means comprises:
   a first variable delay element between the reference component signal generator and the local phase-locked component signal generator for delaying the sync signal; and
   a second variable delay element between the reference component signal generator and the displaying means for delaying the component test signal output.

9. An apparatus as recited in claim 7 wherein the displaying means comprises a waveform display device having a reference component from one of the component test signal outputs as one input and another component from the other of the component test signal outputs as a second input.

10. An apparatus as recited in claim 7 wherein the displaying means comprises:
    means for mixing corresponding components from the component test signal outputs together to produce a timebase jitter signal;
    means for processing the timebase jitter signal in the frequency domain to produce a timebase jitter spectrum; and
    means for displaying the timebase jitter spectrum.

11. An apparatus as recited in claim 10 further comprising means for equalizing the amplitudes of the corresponding components.

12. An apparatus as recited in claim 10 wherein the mixing means comprises:
    a modulator for combining the corresponding components to produce a modulated component signal; and
    means for filtering the modulated component signal to derive the timebase jitter signal therefrom.

* * * * *